April 14, 1942.  S. R. OLDHAM  2,279,338
SHAPE CUTTING MACHINE
Filed Aug. 26, 1937  6 Sheets-Sheet 3

INVENTOR
SAMUEL R. OLDHAM
BY
ATTORNEY

April 14, 1942.  S. R. OLDHAM  2,279,338
SHAPE CUTTING MACHINE
Filed Aug. 26, 1937  6 Sheets-Sheet 4

INVENTOR
SAMUEL R. OLDHAM
BY
ATTORNEY

April 14, 1942.   S. R. OLDHAM   2,279,338
SHAPE CUTTING MACHINE
Filed Aug. 26, 1937   6 Sheets-Sheet 6

INVENTOR
SAMUEL R. OLDHAM
BY
ATTORNEY

Patented Apr. 14, 1942

2,279,338

UNITED STATES PATENT OFFICE 2,279,338

SHAPE-CUTTING MACHINE

Samuel R. Oldham, Elizabeth, N. J., assignor to Oxweld Acetylene Company, a corporation of West Virginia Application August 26, 1937, Serial No. 161,085

25 Claims. (Cl. 266—23)

This invention relates to the art of thermal metal-working by oxy-acetylene torches and particularly to an improved thermal metal-working machine of the type capable of universally moving one or more oxy-acetylene torches in a plane over work to be treated. Although the principles of the invention may be employed with any type of machine, the movement of which is controlled by a pattern, it will be described in connection with oxy-acetylene shape-cutting machines.

Shape-cutting machines in this general class have been provided with various types of propelling means including differentially actuated rollers adapted to frictionally engage and follow a raised templet. Others have been provided with interchangeable hand-guided tracer devices adapted to follow a pattern within the plane of a table.

Difficulties have been experienced with the use of these prior-known shape-cutting machines because their construction is such that excessive inertia forces are set up when the propelling means changes its direction of movement, i. e., when the tracer follows a curved path or turns a sharp corner. The absorption of these forces by the apparatus impairs the accuracy with which cuts can be produced.

The pattern tables used in conjunction with prior-known devices of this type do not afford means to satisfactorily support the templets and still maintain an uninterrupted plane surface upon which patterns may be sketched or prints fastened, and upon which a hand-guided tracer unit may operate.

Flexible tubing in the form of rubber hose, is usually employed for conveying the oxygen and acetylene or other fuel gas to the cutting torches. Prior known machines of the type referred to usually supported these gas conveying tubes at a point substantially above the universally-movable mechanism; thus, the vibrations incident to their movement with said mechanism are amplified and transmitted directly to the blowpipe support, consequently affecting the accuracy of the cut.

An object of this invention is to provide a shape-cutting machine of the character described that will be easy to operate, accurately reproduce any type of complicated pattern, and overcome the difficulties encountered in using known devices of this character. Other objects include: the provision of a propelling unit that will drive a pair of oppositely-rotatable traction elements, or an interchangeable hand - guided tracing device and yet require a minimum of inertia to be overcome in following complicated outlines; the provision of interchangeable, automatically-guided and hand-guided propelling devices so located that either is readily accessible to the operator; the provision of a pattern table adapted to adequately support a raised pattern templet and still maintain a plane surface upon which patterns may be drawn, or prints fastened, and upon which a hand-guided propelling mechanism may accurately travel; and the provision of an oxy-acetylene shape-cutting machine capable of supporting oxygen, acetylene, and electrical conduits in such position that their movement will not detrimentally affect the cut produced by the cutting torch.

Other and more specific objects of this invention include: the provision of means for limiting the universally-movable mechanism to straight line motion; the provision of a combined unitary assembly including a variable speed transmission and a differential unit capable of universally moving the cutting torch in a plane over work to be shaped; the provision of means adapted to compensate for the width of the kerf produced incident to cutting, thus enabling oversize as well as undersize cutting; and the provision of a bevel cutting attachment adapted to produce accurate bevels when the propelling means travels in a curved path.

The above and other objects and the novel features of this invention will become apparent from the following description taken with the accompanying drawings, in which:

Fig. 7 is a vertical sectional view of an interchangeable traction-propelling device capable of being substituted for the unit supporting the pair of traction elements of Fig. 5;

Fig. 8 is an elevational view, partly in section, of a bevel cutting attachment for the machine shown in Fig. 1; and Fig. 9 is a vertical sectional view taken substantially along line 9—9 of Fig. 1, showing the arrangement of parts for adjusting the torch independently of the tracing unit.

Figure 1:
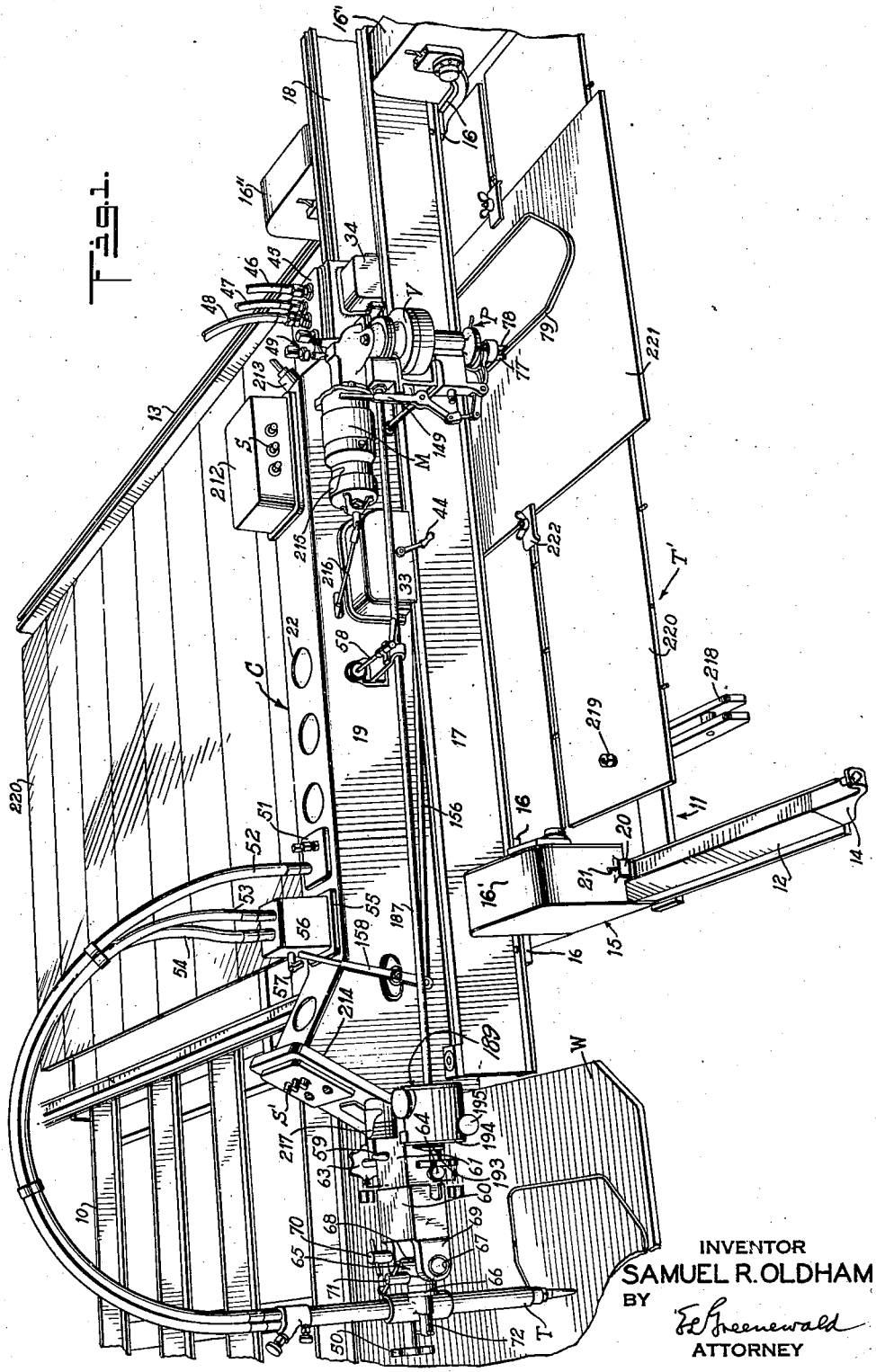
Fig. 1 is a perspective view of a shape-cutting machine embodying the principles of this invention.

Referring to Fig. 1 of the drawings, the invention is disclosed as applied to a shape-cutting machine, including a universally-movable carriage mechanism C provided with one or more thermal implements such as blowpipes or cutting torches T at one end thereof, adapted to be universally moved in a plane over work W to be cut to a predetermined shape. The carriage mechanism C comprises two individual carriages adapted to move along perpendicular paths, one carriage of which is universally guided in accordance with a predetermined pattern or templet mounted on a pattern table T'. The table T' is located between the rails supporting the carriage mechanism for movement along one of its paths. A propelling mechanism P is associated with the carriage mechanism in a manner tractionally to engage a raised templet 79 mounted on the pattern table T', or the plane surface provided by said table.

A work-supporting table 10 and an apparatus-supporting table 11 made up of a number of cast iron sections rigidly bolted together, are arranged in parallel relation. A pair of rails 12 and 13 fastened to the sides of the table 11, and provided with buffers 14 at each end thereof (only one of which is shown), are adapted to support a lower carriage 15 for limited movement longitudinal of the supporting table 11. The absolute straightness of these rails is an important factor in assuring accurate results, and they are therefore built to withstand the heat incident to cutting heavy members by oxy-acetylene cutting torches. The rails 12 and 13 are preferably made of semi-steel, heat-treated to relieve all strain, thereby assuring perfect alignment under the most severe conditions.

The lower carriage 15 comprises frames 16 at the front and rear of the carriage C adapted to ride along the rails 12 and 13. The foremost rail 12 is constructed to accommodate peripherally-grooved wheels (not shown) located at the torch-end of the lower carriage 15, and enclosed within guards 16'; and the rail 13 is provided with a groove adapted to accommodate tongued-wheels (not shown) at the rear of said carriage and likewise enclosed in similar guards 16". A pair of transverse rails 17 and 18 adapted to support an upper carriage 19, are rigidly fastened to the supporting frames 16 between the wheel guards 16' and 16". These rails are likewise provided with buffers similar to those on rails 12 and 13. The supporting frames 16 are preferably constructed of cast iron and in such fashion that the bottom of the upper rails 17 and 18 which rest on them are below the center of the wheels of the lower carriage 15, thus lowering the center of gravity of the entire carriage structure. The front and rear wheels of the lower carriage 15 on the far side of the machine as it is represented in Fig. 1, are preferably connected by an enclosed shaft (not shown) so that wheel action at both ends of the lower carriage will be identical.

All four wheels of the lower carriage 15 are of cast iron, and are provided with anti-friction bearings completely enclosed, and lubricated for the life of the machine. The front wheels are protected by aluminum guards 16', and heavier cast iron guards 16" protect the rear wheels and assist in counterbalancing the weight of the overhanging parts at the torch or front end of the machine. Rail wipers 20 are provided at both sides of each wheel, and those on the near side of the carriage 15, both front and rear, are constructed of wire brake lining to provide a brake which can be regulated by an adjusting screw 21. The other two rail wipers are of a high grade felt, and are held against the rails by small springs.

The upper carriage rails 17 and 18 are firmly secured to the front and rear frames 16 of the lower carriage 15, and are constructed of a high-strength extruded aluminum alloy. Exact alignment of the rails 17 and 18 is accomplished by a series of tie rods at regular intervals throughout the length of these rails.

The upper carriage 19 is constructed and arranged to support substantially all of the operating controls, most of which are in duplicate so as to be accessible from both the cutting and tracing postions of the shape-cutting machine. The forward end of the carriage 19 is adapted to support the cutting torch T, and therefore over-hangs the work W to be shaped. Due to its close proximity with the heated work, difficulty has been experienced in preventing the upper carriage from warping, or being detrimentally affected by the extreme heat incident to cutting. In the present embodiment, these difficulties have been overcome by constructing the upper carriage 19 of a special hollow casting made of high-strength aluminum alloy, giving an efficient strength-weight ratio. In order to permit an even distribution of the heat absorbed by the forward portion of the carriage 19, this casting has been provided with a series of apertures 22 which serve a dual function, namely, to lighten the upper carriage 19, and to permit circulation of air therethrough so that the heat of cutting may be distributed, and equal expansion thus secured throughout the length of the casting.

Figure 3:
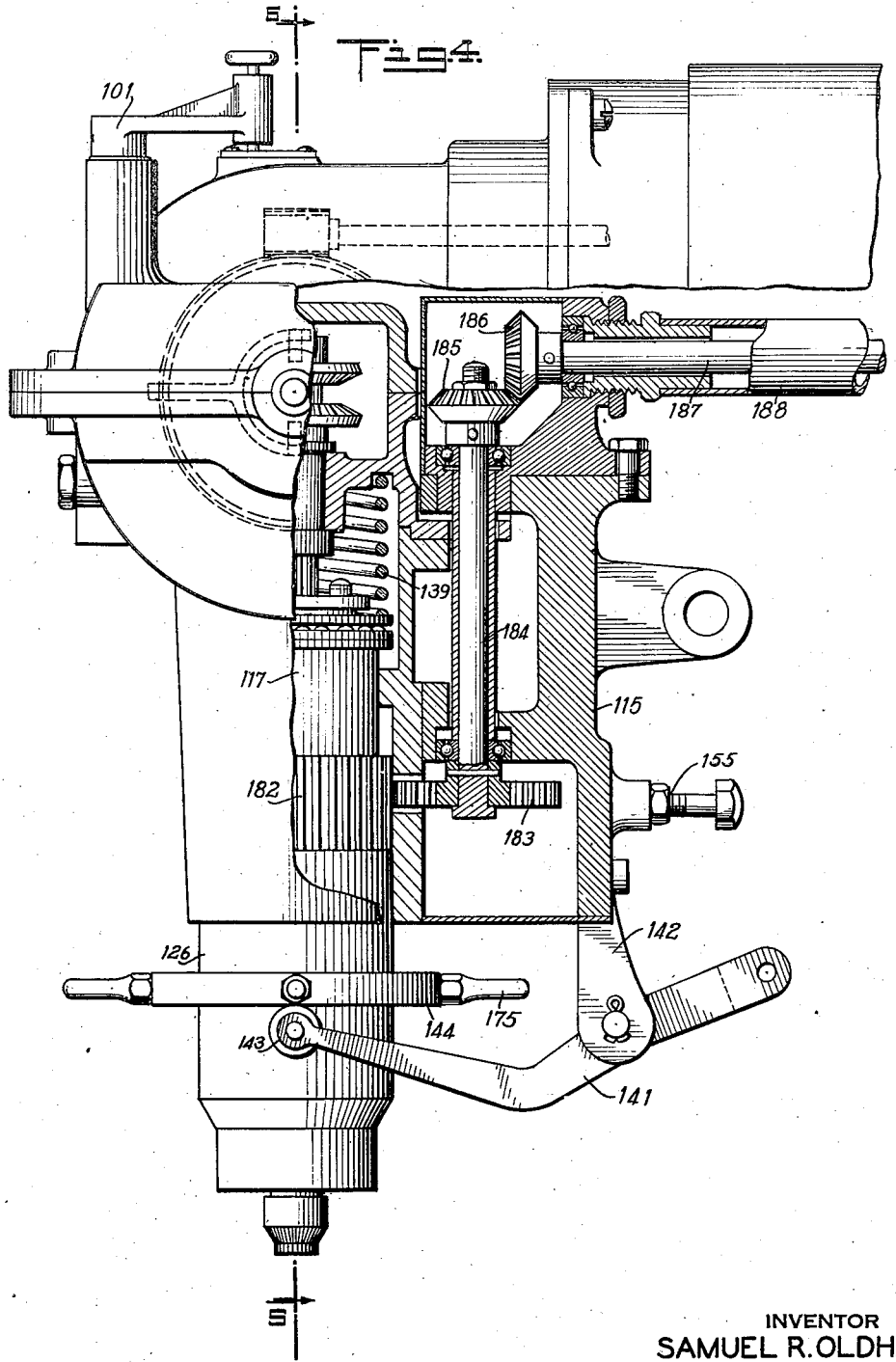
Fig. 3 is an end elevational view of the mechanism of Fig. 2, disclosing the under-slung wheel construction of the upper carriage.

Referring to Fig. 3, the upper carriage 19 travels on the upper carriage rails 17 and 18 by means of eight wheels, four of which ride on the under lips 23, while the remaining four ride on the upper lips 24 of these rails.

One pair 25 of these wheels is adapted to engage the under lip 23 of the rails 17 and 18 at the rear of the upper carriage 19 for the purpose of carrying the load imposed by the over-hung weight of said carriage. The wheels or rollers 25 are supported by a bearing sleeve 26 pivotally mounted on the rear of the carriage 19 by a pivot bolt 27, as shown in Fig. 3, allowing the over-hanging carriage 19 to press the wheels 25 firmly against the underlip 23 of rails 17 thereby compensating for any structural irregularities in the rails which would affect the motion of the carriage 19 during its travel. One of the wheels 25 is fixed to a rotatably-mounted shaft 28, while the other wheel is journalled on the rotatably-mounted shaft. An upper pair of wheels 30 provided at the rear of the carriage 19 ride on the upper lips 24 of the rails 17 and 18 and aid in preventing tilting of the carriage 19.

Figure 2:
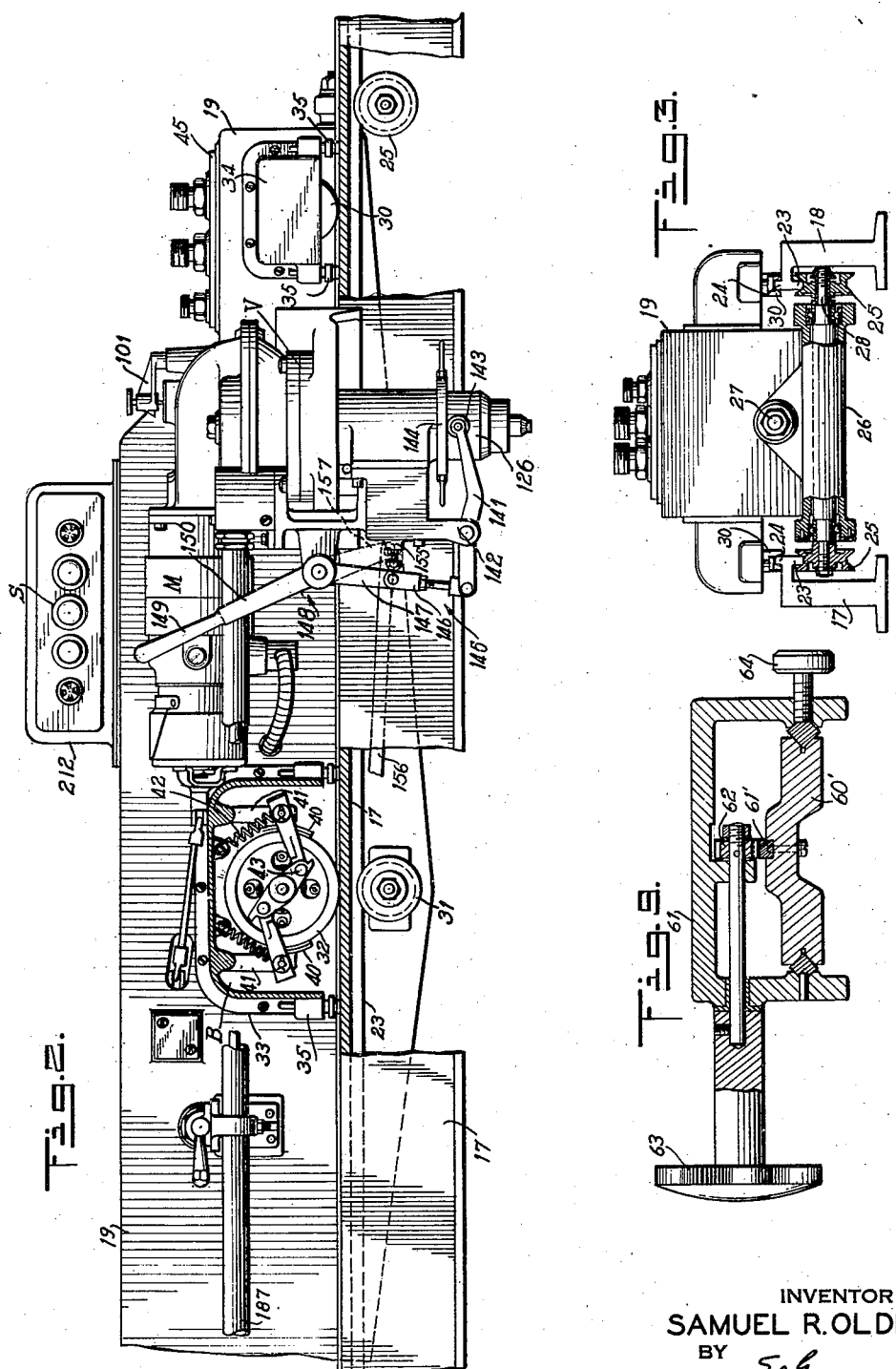
Fig. 2 is a side elevational view of a portion of the machine disclosed in Fig. 1, broken away in part to show the brake construction of one of the carriage wheels.

As shown in Fig. 2, two pairs of wheels are located somewhat further forward on the carriage 19, one pair 31 riding on the under lip 23 of the rails, and the other pair 32 on the top of the rails 17 and 18. These wheels 32 assist the wheels 25 in carrying the over-hung blowpipe load, while the under pair 31 cooperates with wheels 30 to prevent tipping of the carriage 19.

The eight upper carriage wheels are grooved to fit corresponding tongues formed by the upper and under lips 24 and 23 of the rails 17 and 18, and all of these wheels are provided with the same double felt-seal ball bearings as those provided for the lower carriage wheels. Guards 33 and 34 are mounted on the upper carriage 19 in position to cover and protect the upper wheels 30 and 32, and spring-held felt wipers 35 are provided at the front and rear of each of these wheels for maintaining the upper rails 17 and 18 clean.

It will be apparent that the arrangement of the several wheels of the upper carriage 19 affords great stability combined with complete freedom of movement. The use of the underslung wheels 25, in cooperation with wheels 32, makes it possible to dispense with a counterbalance weight, and the pivotal support for wheels 25 together with their independent action adequately insures that all weight carrying wheels are it contact with the rails 17 and 18 at all times.

While the above described carriage mechanism C is capable of universally conveying the blowpipe torch T in a plane over work to be shaped, it is often desirable to limit the movement of the torch T to a straight line, either longitudinally of the rails 12 and 13, or transversely thereof. This may be accomplished by limiting the carriage mechanism C to movement along only one of its paths. In the present instance a brake mechanism B is associated with one of the wheels 32 of the upper carriage 19, and a like mechanism is associated with one of the wheels of the lower-carriage 15. Because the mechanism for limiting the carriage to movement along either of its paths is identical, the same will be described only in connection with the wheel 32 of the upper carriage 19. As shown in Fig. 2, this limiting mechanism comprises a pair of brake shoes 40 associated with the periphery of the wheel 32, each of which is mounted on one of a pair of supports 41 depending from the interior of the guard 33. Springs 42 are connected to the guard 33 and to the respective brake shoes 40 so as to urge the same into frictional engagement with the outer periphery or rolling surface of the wheel 32. A toggle joint 43 is mounted on the wheel guard 33 and is adapted upon movement between two positions to release the brake shoes 40, and to permit springs 42 to effect frictional engagement between said shoes and the wheel 32. A crank arm 44 (see Fig. 1) is connected to a link of the toggle joint 43 and extends outside of the guard 33. When the crank 44 is turned, the wheel with which the limiting mechanism is associated is either released or held stationary. The use of spring-controlled brakes is particularly advantageous because, although the carriage may be securely prevented from moving during operation of the machine, it can be moved if necessary by manual force without changing the lever position.

The upper carriage 19 is formed from a hollow casting through which a series of rigidly mounted brass pipes are adapted to pass, each of which is provided with inlet and outlet connections located at the rear and front respectively, of said upper carriage.

Referring again to Fig. 1, a plate 45, rigidly attached to the rear upper surface of the carriage 19 supports a plurality of threaded connectors in position to be securely attached to the individual brass pipes passing within and longitudinally of the carriage 19. This connector assembly accommodates an oxygen supply 46, a preheat oxygen supply 47, an acetylene supply 48, and inlet and outlet water connections 49. The forward portion of the carriage 19 is provided with plates 51 and 55 adapted to support a like number of connectors associated with the forward ends of the brass pipes, which connectors accommodate an oxygen delivery tube 52, a preheat oxygen delivery tube 53, and an acetylene delivery tube 54 and cooling water connections. The plate 55 also supports a housing 56 within which is located a preheat gas operating valve which may be actuated by an operating lever 57. The short lengths of the flexible tubing provided for joining the various connectors to the cutting torch T limit the unsupported length of gas passages to a minimum, and thereby eliminate any vibrations incident to swaying of the conduits during operation of the machine. Flow of the cutting oxygen to the torch T is controlled by the operation of a valve located in the gas-conveying brass pipe within the carriage 19. A valve-operating lever 58 is located midway of the length of the carriage 19, and is interconnected with a lever 59 located at the front of the carriage. Since the levers 58 and 59 are interconnected, the cutting oxygen supply may be turned off or on by either, without the necessity of manipulating the cutting oxygen valve on the torch T.

The torch T may be adjusted over the work W independently of the carriage C. Referring to Figs. 1 and 9, the torch T is attached to a clevis support 60 within which is located a guide member 60'. The support 60 is adapted to telescope with a support 61 fixed to the front of carriage 19. The guide 60' extends beyond the support 60 and is provided with a rack 61' in mesh with a pinion 62. The pinion 62 is mounted within the support 61, and is rotated by a handle 63. Thus it is seen that relative movement between the torch T and carriage C may be effectively accomplished, and any adjustment may be maintained by locking means 64.

Angular adjustment of the torch T is also provided by two inter-pivoted aluminum brackets 65 and 66. The bracket 65 comprises a ground stainless steel tube 67 within a tubular member 68 held between the ends of a clevis 69. Tube 67 is securely held in position by means of a draw bolt 70, and the bracket 66 is held to the tube 67 by another draw bolt 71. A third draw bolt 72 permits adjustment of the torch T relative to the bracket 66. Vertical adjustment of the torch T is effected by rotating a handwheel 50 fixed to a pinion supported on the bracket 66 and meshing with a rack integral with said torch.

From the foregoing description it is apparent that the torch T can be inclined at different angles in two planes, or at compound angles, and for accurately inclining the same, the brackets 65 and 66 are provided with adjustable micrometric positioning scales.

Figure 5:
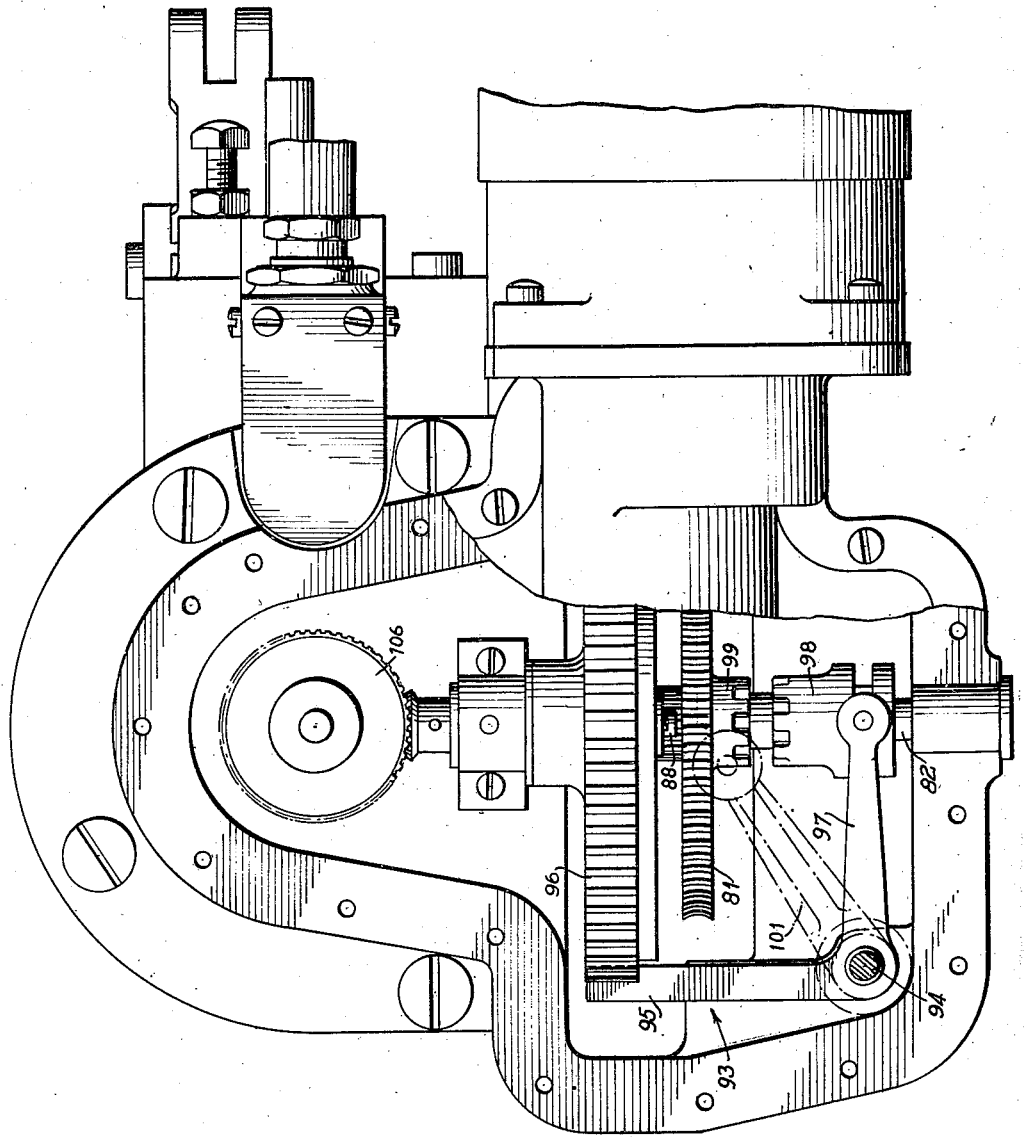
Fig. 5 is a vertical sectional view taken substantially along line 5—5 of Fig. 4.

The traction-propelling device P comprises a motor M, rigidly mounted on the upper carriage 19 in operative association with a combined variable-speed transmission and differential unit V which drives a pair of spaced shafts 75, 76 (see Fig. 5). These shafts are adapted to be connected to a pair of oppositely-rotatable, traction-propelling elements 77, 78 arranged to engage a raised templet or pattern 79 on table T'. Shafts 75, 76 are further adapted to interchangeably accommodate a hand-guided traction-propelling unit H (see Fig. 7), adapted to follow a predetermined pattern substantially within the plane of the top surface of pattern table T'.

Figure 6:
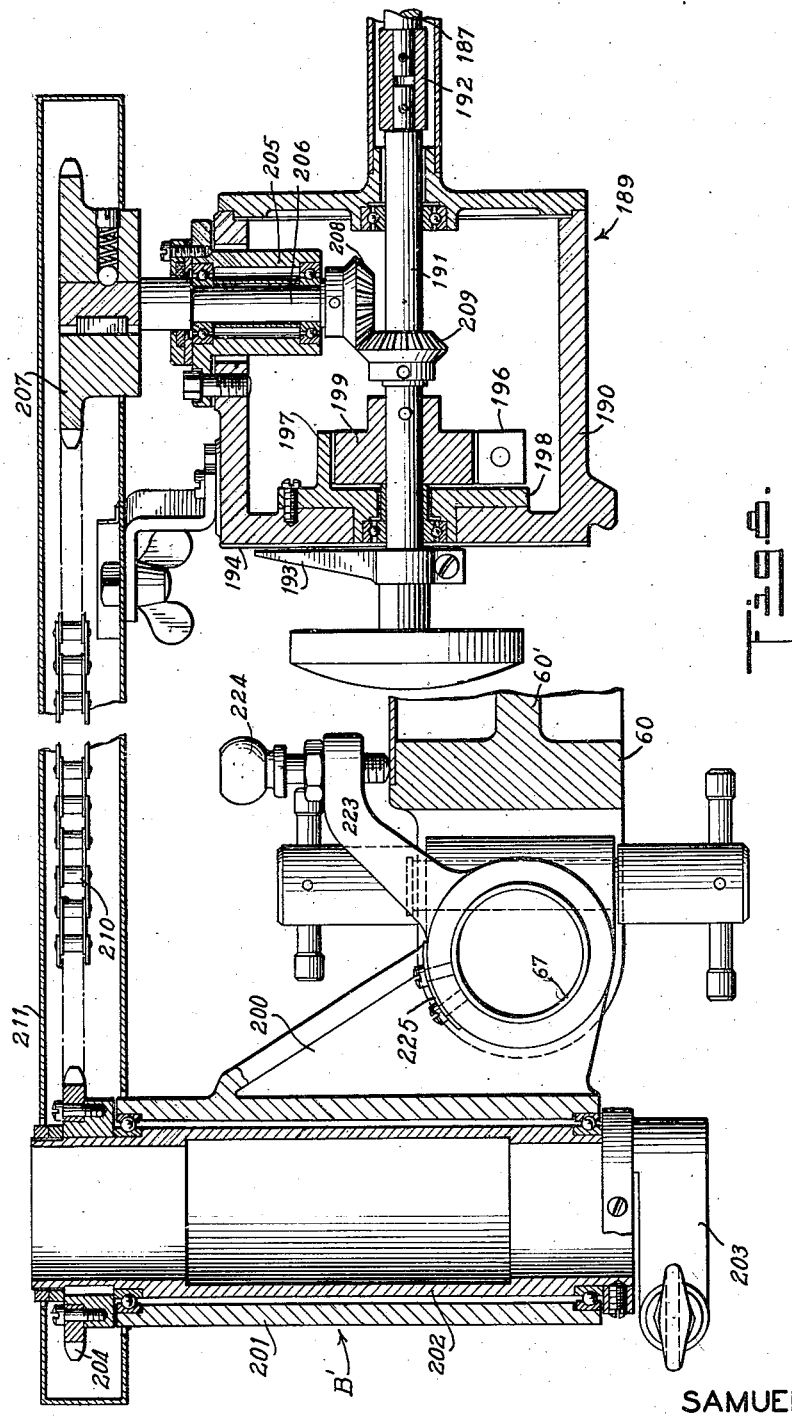
Fig. 6 is a top plan view of the driving mechanism shown in Fig. 4, with the top cover removed.

Referring to Fig. 5 of the drawings, one form of a combined variable-speed transmission and differential unit for the traction-propelling device P comprises a worm 80 fixed to the extended shaft of the motor M, and in driving engagement with a worm gear 81 journalled on an extended power shaft 82 which is supported by bearings 83 and 84. The worm gear 81 is provided with a pinioned hub 85 adapted to mesh with a pair of spur gears 86 and 87 journalled on diametrically spaced pins 88 and 89 on a hubbed flange plate 90. A second hubbed flange plate 91 is journalled on the hub plate 90 and is adapted to support an internal ring gear 92 near its periphery. The ring gear 92 is adapted to mesh with the pair of pinions 86 and 87 thus forming a planetary arrangement therewith. The outer periphery of the flange plate 91 is provided with a locking means in the form of gear teeth 96 adapted to be engaged by an inter-meshing bell-crank brake-device 93 pivotally mounted within the transmission housing by a pin 94 (see Fig. 6). One arm 95 of the bell-crank lever forms the inter-meshing portion of brake 93, while the opposite arm 97 of said bell-crank is associated with a slip-ring clutch element 98 splined to the shaft 82. A complementary clutch element 99 is integrally associated with the worm gear 81, and upon axial movement of the element 98 into clutching engagement with the element 99, rotation of the worm gear 81 is transmitted directly to the shaft 82. Movement of the clutch element 98 into engagement with the clutch element 99 is effected by turning the bell-crank lever 93 so that the brake-arm portion 95 thereof is moved to a position releasing the flange plate 91, thus permitting its free movement on the hub of flange plate 90.

From the foregoing description of the planetary transmission mechanism it is obvious that rotation of shaft 82 at two different speeds may be effected. With the parts in position as shown in Fig. 5, flange plate 91 is prevented from rotating by the engagement of the brake-arm 95 with the gear teeth 96 on the periphery of plate 91, and the rotation of worm gear 81 is transmitted through pinion 85 to gears 86 and 87 which rotate as a unit with the flange plate 90 in a counterclockwise direction viewed from right to left. This motion is transmitted directly to shaft 82 through the key 100. Upon movement of a crank handle 101 (see Fig. 2) associated with the bell-crank brake 93, simultaneous release of the plate 91 and engagement of the clutch element 99 are effected. In this position, the rotation of worm gear 81 is directly transmitted to the shaft 82 through the clutch elements and the key 102. During clutching engagement between the elements 98 and 99, ring gear 92, the gears 86 and 87 and the flange plate 90 are all keyed to shaft 82, and consequently, the entire planetary unit rotates as a fly-wheel at the speed imparted to shaft 82 from the worm gear 81.

The variable speed imparted to the shaft 82 may be used to drive the pair of traction-propelling elements 77, 78, or the hand-guided propelling device H. In the present embodiment of the invention, this has been accomplished by providing a pair of independently-rotatable mutually telescoping shafts 103 and 104, adapted to support a pair of oppositely-disposed bevel gears 105 and 106, respectively. The bevel gear 105 is fixed to the tubular shaft 103 by a set screw, while the bevel gear 106 is fixed to the internal shaft 104 by a pin 107. A bevel gear 108 is fixed to the shaft 82 in position to mesh with the bevel gears 105 and 106; thus rotation of shaft 82 will cause the axially aligned driving shafts 103 and 104 to be rotated in opposite directions and at the same speed. The shafts 103 and 104 are further provided with extended gear portions 109 and 110 at their lower ends for a purpose to be described later.

In order to insure positive tractional engagement at all times between either or both of the oppositely-rotatable traction elements 77, 78 and the sides of the raised templet 79, especially when the templet defines a curved path, provision must be made to compensate for the rotational variation of the traction elements as they move as a unit about said curved templet. The traction elements 77, 78 must, therefore, be capable of bodily rotation as a unit about an axis midway between the same and at a right angle to the surface supporting the templet. The present invention provides a unit having few rotatable parts, thus minimizing the inertia forces incident to its bodily rotation. This unit or differential means is constructed so that positive driving will occur even though one of the traction-propelling elements is disengaged from the templet. The unit is supported within a housing 115 rigidly fixed to the transmission casing 116. The housing 115 is counterbored to receive a rotatable steering sleeve or supporting body 117 which, in turn is counterbored to receive and support the pair of driving elements or shafts 75 and 76. These shafts are provided with pinions 120 and 121 disposed on diametrically opposite sides of and in driving engagement with the extended gear portions 109 and 110 respectively, of the shafts 103 and 104. Such an arrangement effects a positive drive at all times to the shafts 75 and 76, and upon bodily rotation of the sleeve 117, produces an incremental increase and decrease in rotation of the respective shafts in accordance with the direction of rotation of the sleeve, the change being proportional to the angle of rotation of sleeve 117.

The size and length of the counterbore of steering sleeve 117 provides ample clearance for axial movement of the pinions 120, 121 with respect to the gear portions 109 and 110 for a purpose to be described later.

The steering sleeve 117 is provided at its lower extremity with a bearing 122 adapted to support the extended portion of shaft 104 thus maintaining it as well as the telescoping shaft 103 in fixed axial position. The ends of the driving shafts 75 and 76, opposite the spur gears 120, 121 are provided with splined connections 123 and 124 for transmitting their rotary movement to the traction-propelling elements 77, 78. Thrust collars 125 are pinned to the driving shafts 75 and 76, above the splined connections and in position to abut against the end of the steering sleeve or supporting body 117.

An extension 126 of the steering sleeve 117 is removably secured thereto by a plurality of circumferentially-spaced set screws 127. The extension 126 is bored to receive a traction-propelling unit 128, removably secured thereto by a screw 129. The traction-propelling unit 128 comprises a cylindrical element 130 provided with a pair of spaced bores adapted to receive a pair of shafts 131 and 132. The upper extremities of these shafts are provided with fluted socket portions 133, 134 adapted to cooperate with the splines 123 and 124, respectively. The lower extremities of these shafts are journalled for accuracy in anti-friction bearings 135 and 136, and support the pair of knurled-headed traction-propelling elements 77 and 78 which are adapted to engage the raised templet 79 on table T'.

It is desirable to provide means for resiliently urging the propelling elements 77, 78 into driving engagement with the templet 79, and it often becomes necessary to manually raise these elements out of engagement with said templet when it is desired to move the mechanism P from one pattern to another. This function has been accomplished in the present construction by providing cylindrical bearing surfaces 137 and 138 in housing 115 to guide sleeve 117 and its associated parts for vertical movement. The recess formed in the counterbored housing 115 encloses a coiled spring 139 in abutting relation with an anti-friction thrust bearing 140 positioned on the upper extremity of the steering sleeve 117. This construction provides means for resiliently urging the driving means consisting of the shafts 75, 76 and pinions 120, 121 towards the lower ends of shafts 103, 104, and also for resiliently urging the traction-propelling elements 77, 78 into driving engagement with the templet 79, while permitting vertical movement of these elements relative to the templet. Since gears 120, 121 remain at all times in mesh with gears 109, 110, the arrangement also maintains a positive drive at all times between the elements 77, 78 and the motor M.

Figure 4:
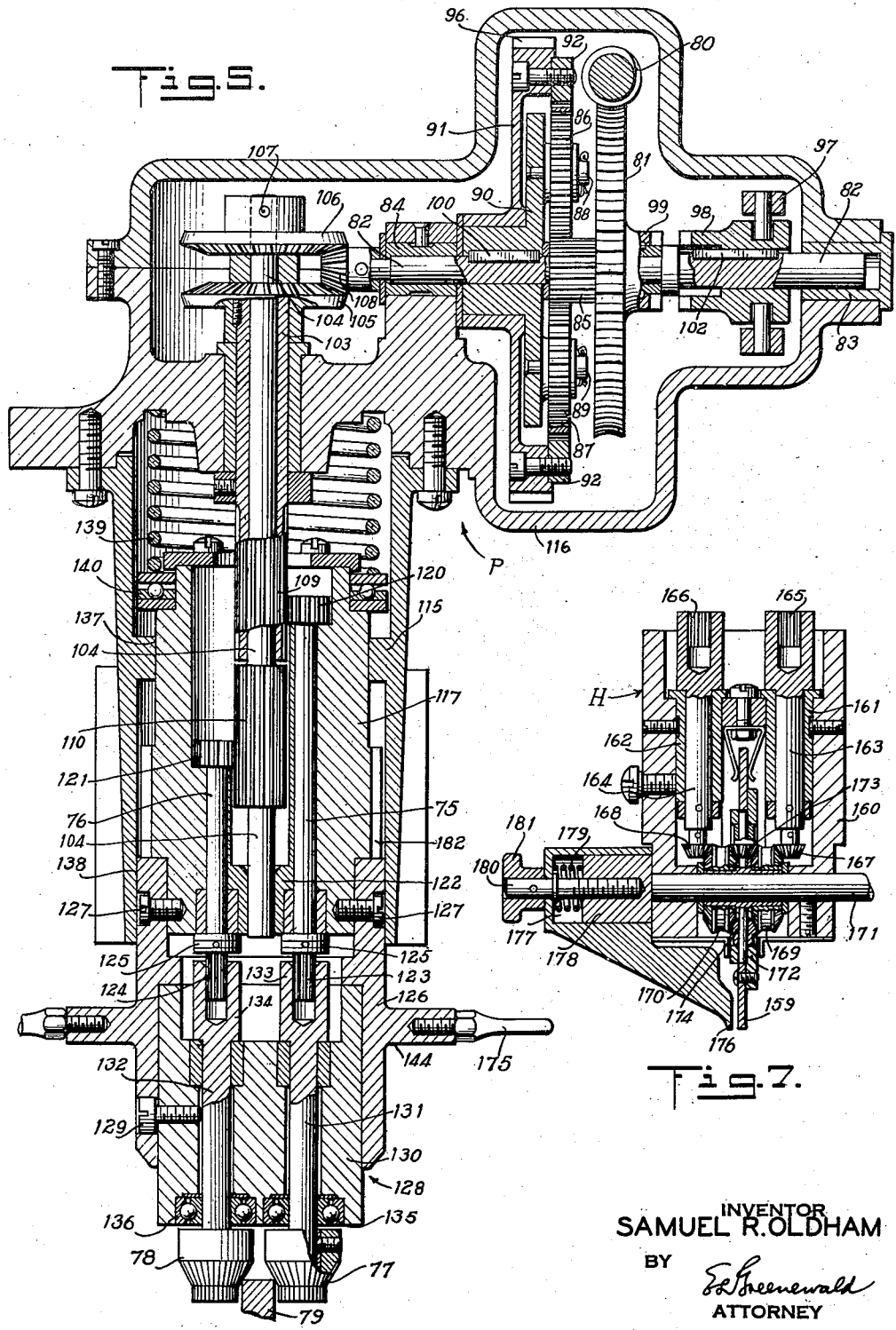
Fig. 4 is an elevational view, partly in section, showing a portion of the traction-propelling apparatus, including the steering mechanism, of Fig. 2, but rotated through 180°.

Manually operable means may be provided for moving the traction-propelling elements 77, 78 out of engagement with the templet 79, against the action of spring 139. This has been accomplished by providing a system of levers adapted to be operated from a point near the tracing unit and also from a point near the torch T. Referring to Figs. 2 and 4, a forked lever 141 pivoted to a depending bracket 142 supports rollers 143 in operative engagement with a flange 144 integral with the extension 126 of the steering sleeve 117. Oscillatable movement of the lever 141 about its pivot may be effected by the combined action of a toggle-joint 145 and the spring 139. An arm 146 of the toggle-joint 145 is pivoted to the opposite end of lever 141 from that which supports rollers 143. An arm 147 of a bell-crank lever 148 is pivotally connected to the free end of arm 146 thus completing the toggle-joint construction which may be moved to extended or contracted position by a handle 149 associated with the remaining arm 150 of the bell-crank lever 148. An adjustable abutment 155 is located in position to hold the toggle-joint extended just beyond a dead-center position, but permits the joint to be broken by movement of the arm 150 in a clockwise direction. In order to facilitate the movement of the traction elements into and out of engagement with the templet from the torch end of the machine, a forwardly extending rod 156 is provided which is connected to a lever 157 fixed to the pivot shaft upon which bell-crank 148 is fixed. Movement of a handle 158 (see Fig. 1) pivoted at the torch end of the carriage 19 and attached to the rod 156, effects the making and breaking of toggle 145.

Referring to Fig. 7, the interchangeable hand-guided tracer unit H embodies a rotatable traction disc 159 adapted to be hand-guided along a predetermined pattern within the plane of table T'. The oppositely rotatable driving shafts 75 and 76 are adapted to impart rotative movement to the disc 159. These shafts, however, will be bodily rotated about the longitudinal axis of shafts 103 and 104 under the same conditions stated in connection with the bodily rotation of elements 77, 78, and consequently a proportionate variation in the rotation of these shafts will be effected. Because of this differential action, it is necessary to provide means within the hand-guided traction-propelling unit H which will compensate for or negative the rotational variations of the shafts 75 and 76. In the present instance a differential-compensating mechanism is associated with the unit H and comprises a differential gear train disposed within a cylindrical body portion 160 which is adapted to seat and be secured within the bore of the extension 126. The body portion 160 is counterbored and bored to receive a pair of sleeve bearings 161, 162 for journalling a pair of shafts 163, 164. The upper extremities of these shafts are provided with fluted sockets 165, 166 adapted to cooperate with the splines 123, 124 in the same manner that the fluted sockets 133, 134 of shafts 131 and 132 cooperate therewith. The lower extremities of shafts 163 and 164 are provided with bevel gears 167 and 168, each of which is adapted to engage and drive a compound bevel-unit 169 and 170 respectively. Compound bevel-units 169 and 170 are freely mounted at opposite sides of the disc 159 on a shaft 171. The traction-propelling disc 159 is provided with a knurled periphery circumscribing a spider 172 also mounted to rotate about the shaft 171. A pair of bevel gears 173 and 174 are supported on a pair of removable radial arms of the spider 172, and mesh with the compound bevel-units 169 and 170. From the foregoing description, it becomes apparent that the opposite rotation of the bevel gears 167 and 168 rotate the pair of compound bevel units 169 and 170 in the same direction about shaft 171. The free floating gears 173 and 174 transmit this unidirectional rotation to the disc 159 and they compensate for rotational variations of shafts 163, 164 incident to bodily rotation of the unit.

The traction-propelling unit just described may be conveniently guided over lines or sketches on the surface of table T' by means of radially disposed handles 175 circumferentially spaced about the flange 144 on the extension 126.

The width of the kerf produced by cutting the work W is dependent upon the bore of the nozzle of torch T, and upon the pressure of the oxygen within the end of the nozzle at the point where the jet discharges into the atmosphere. Therefore, when nozzles having different characteristics are used in cutting operations, the kerf widths produced will be different. The width of the kerf produced under a certain set of operating conditions can easily be computed from known or determinable data of the particular nozzle being used. Ordinarily, it is necessary to form the templet pattern so that its dimensions will compensate or make sufficient allowance for the width of the kerf produced in the work being shaped. Usually when it is desired to trace directly from a working drawing or print or the like, in order to produce a finished shape of the desired dimensions, it becomes necessary to re-draw the working drawing or print to a size, the dimensions of which are sufficiently changed to make allowance for the kerf which will be produced.

The present invention includes a kerf compensation means or means to make allowance, in positioning the torch T, over the work W, for kerfs of different widths which may be produced in a cutting operation, said means being associated with the hand-guided tracer unit H, comprising an adjustable pointer 176 located in spaced relation with, and adjacent to the traction disc 159. The pointer 176 extends substantially perpendicularly toward the surface upon which the disk 159 travels, and is provided with shifting means comprising a counterbored sleeve portion 177 adapted to slidingly engage a bearing block 178 integral with one end of the shaft 171. The internal length of the counterbored sleeve portion is greater than the length of block 178 thus providing a recess for accommodating a coiled spring 179, for a purpose to be described later. A stud 180 is provided with external screw threads at one end adapted to engage corresponding internal threads in the block 178, while the other end of the stud includes an integral flange adapted to engage that portion of the sleeve 177 which forms the outer end of the counterbored recess. An extension of the stud 180 protrudes beyond the sleeve portion 177 and supports an adjusting knob 181 in fixed abutting relation with the outer end surface of the sleeve 177. The coiled spring 179 is adapted to be positioned against the outer end of the bearing block 178 and within the counterbored portion of the bearing sleeve 177 in order to maintain the pointer 176 in adjusted relation by continually urging it and the associated stud 180 outwardly, thus increasing the frictional resistance between the external threads thereof and the corresponding internal threads within the bearing block 178. Rotation of the knob 181, therefore, causes movement of the pointer 176 to or from the traction disc 159. Thus it will be observed that a pattern may be laid out on the pattern table T' to the exact size of the finished piece, or a blue print or sketch of the exact size of the finished work may be fastened to said table, and by correctly adjusting the position of the pointer 176 and using this pointer as a tracing guide, the traction-propelling means 159 may be located in predetermined positions with respect to the patterns or sketches and may be maintained in the same relative positions throughout the tracing operation. The torch T is thereby propelled over the work W so that sufficient allowance is made for the width of the kerf produced during the cutting operation, thus permitting a shape of the desired dimensions to be formed. If it is desired to make an over size cut, for instance, to allow for finishing the outer edge of the shape, since the kerf width may be calculated from known data, the tracer-adjustment pointer 176 may be set a distance from the tracer wheel sufficient to allow for the kerf width and oversize, and the pattern traced by the pointer with the tracer wheel outside the pattern or sketch which has been laid out on the table T'. Similarly, if it is desired to make an undersized cut, for instance, to allow for finishing the inside edge of an interior shape, the pointer can be appropriately set, and the same may then be made to follow the pattern outline with the tracer wheel inside of the pattern. This arrangement, therefore, contributes greatly to the precision cutting possibilities of the herein described machine.

Machines of the type described are intended to possess great cutting capacities, and consequently their dimensions are such that duplicate sets of controls are necessary in order to facilitate operation. It is particularly advantageous to be able to control the operation of the machine from either the tracing, or the cutting-torch portion thereof.

It often becomes necessary to operate the hand-guided traction-propelling unit H from the forward end of the shape-cutting machine adjacent the torch T. Such operation is advantageous when it is desired to inspect the cut as it progresses, and to make specific angular cuts, or to make cuts following a pattern drawn directly on the work to be shaped. This may be accomplished by providing a remote control associated with the steering sleeve 117. Referring to Fig. 4, gear 182 is formed about the periphery of the sleeve 117, and meshes with a spur gear 183 fixed to a vertically disposed shaft 184 journalled within a lateral extension of the housing 115. The upper extremity of the shaft 184 is provided with a bevel gear 185 in driving engagement with a similar bevel gear 186 fixed to a horizontally disposed shaft 187. The rod 187 extends along and to the front of the carriage 19 (see Fig. 1). Referring to Fig. 8, the forward end of rod 187 is connected to a tracer-direction actuating device 189 which comprises a housing 190 within which a stub-shaft 191 is journalled in alignment with the rod 187. The stub-shaft and rod are joined by a coupling 192. The end of shaft 191 opposite to that which supports coupling 192, extends through a side wall of housing 190, and fixedly supports a pointer 193 adapted to scan a protractor scale 194 mounted on the outside of housing 190. The hand-guided propelling device H may be adjusted to cause torch T to follow any desired angular cut, and means is provided for locking the same in adjusted position. The locking means comprises a knob 195 (see Fig. 1) fixed to one end of a shaft, the other end of which engages the free ends 196 of a friction ring 197. The ring 197 is integral with a plate 198 fixed to the inside of housing 190, and it is adapted to encircle a brake drum 199 pinned to shaft 191. With the above arrangement, it is observed that when the pointer 193 is set for any given angle, it is possible to cut exactly parallel angular cuts by lifting the traction wheel 159 from the table T' by actuating the handle 149 or 158, and moving the carriages over any desired distance without altering the previous setting.

For the purpose of making bevel cuts in accordance with a curvilinear templet pattern, an interchangeable attachment B' is adapted to be employed, which operates to turn the torch T about its longitudinal axis in accordance with, and proportional to the turning of the templet-following device P when the latter follows a curved pattern. When the attachment B' is employed, the torch T is adapted to be provided with an angle nozzle-adaptor, or with nozzles bent to the angle of the desired bevel. Referring again to Fig. 8, the attachment B' comprises a torch-holder bracket 200 pivotally supported on tube 67 in place of the bracket 68. The bracket 200 is provided with a cylindrical sleeve 201 adapted to support a freely rotatable bearing sleeve 202. The sleeve 202 is adapted to receive a standard torch body T. It is provided at its lower end with a clamp 203, and at its upper end with a sprocket 204 removably attached thereto. An arm 223 of the bracket 200 is adapted to support an adjustable set screw 224 which abuts against the clevis support 60 for accurately locating sleeve 201 in a vertical position. An indicator 225, mounted on the bracket 200, is adapted to indicate when the sleeve 201 is in vertical position.

When the tracer mechanism P travels along a curved templet, its rotational movement is transmitted to the steering rod 187, and this motion must be further transmitted to the sprocket 204 so that the torch T and its bevel-cutting nozzle will be rotated in accordance with the rotation of the mechanism P. This has been accomplished by providing an opening in the top portion of housing 190 within which a vertically disposed bearing sleeve 205 is positioned. A stub shaft 206 is journalled in the sleeve 205, extending to a point within housing 190 adjacent to shaft 191, and to a point outside of said housing, and upon which a sprocket 207 is fixed in alignment with the sprocket 204. The lower end of shaft 206 is provided with a bevel gear 208 which meshes with a similar bevel gear 209 pinned to shaft 191. A driving connection between sprockets 204 and 207 is established by a sprocket chain 210 enclosed by a chain guard 211.

A dual control feature which facilitates the operation of the apparatus comprises an electrical control box 212 mounted on, and near the rear of the upper carriage 19, as shown in Fig. 1. This box is provided, as at S, with three switches, namely, a forward, a reverse, and a stop switch, all of which are appropriately connected in an electrical circuit receiving current from the power supply connection 213. Branches of the above-mentioned circuit extend within the upper carriage 19 to a duplicate control box 214 located at the forward end thereof. The control box 214 is provided with a set of switches S' similar to those in box 212, and connected in parallel therewith.

It is often desirable to observe the speed of cutting, or movement of the carriage mechanism at the forward end of the machine as well as at the tracing portion thereof. Accordingly, a suitably calibrated speed indicator 215 is mounted in operative relation with the motor M. A drive shaft 216 universally connected to the indicator 215 extends through the upper carriage 19 to a similar speed indicator 217 mounted on a panel of the control box 214. Thus, it is observed that the operator may conveniently control the operation of the machine from either the tracing, or the cutting-torch portion thereof.

Referring to Fig. 1 of the drawings, the pattern table T' is shown disposed between the pair of rails 12 and 13. The apparatus supporting table 11 is adapted to accommodate a pair of supports 218 adjacent each edge thereof, only one of which is shown. The supports 218 are made up of two identical rods in closely spaced relation for receiving T-headed bolts 219 which in turn are arranged to lock in place, respective plate-sections 220 of polished aluminum alloy which form the pattern table surface. Dowel pins are provided in the abutting edges of the plates 220 and are adapted to accurately locate the same, and to hold them in position to provide a level surface at the joints. The plates 220 are further provided at each end with apertures adapted to receive the shanks of T-headed bolts 219. By simply loosening these T-headed bolts, without removing them, the aluminum tracing-table plates 220 may be separated and moved along the table frame as desired, thus facilitating the mounting of templet supports 221 in any position along the table length. This latter function may be accomplished by providing hold-down means in the form of clamps 222 adapted to be positioned between adjacent plates 220 when the same are separated.

It will be understood that the arrangement above described makes it possible for the templet supports 221 to be firmly secured to the table top with no possibility of accidental shifting during operation of the machine. For hand tracing, designs may also be clamped to the table whether they be drawn on paper or other material. The construction of the surface of table T' provides excellent traction for the wheel 159 of the hand-guided tracing unit H, so that if desired, a pattern may be drawn directly on the aluminum surface, the cut made, and the pattern easily erased.

The present invention is not limited to the exact structure and arrangement shown, but is intended to embrace similar and equivalent elements, and features having an equivalent relative arrangement. The particular structure shown as an example of a preferred embodiment of the invention may be of different form and relative arrangement without departing from the spirit of the invention or the scope of the claims.

What is claimed is:

1. A metal-working machine comprising in combination a pair of carriages adapted to move along mutually perpendicular paths for conveying a thermal implement universally in a plane over a workpiece; a motor rigidly mounted on one of said carriages; a pair of axially aligned driving means both positively connected to said motor for uniform rotation in opposite directions; a support rotatably mounted relative to said motor; a pair of spaced drive elements carried by said support and in driving engagement with said respective driving means, said elements being revolvable about the periphery of said driving means as said support rotates; and a traction-propelling device comprising a pair of oppositely driven traction elements severally operatively connected with said drive elements, whereby rotational movement of said support incrementally increases and decreases the rotation of said respective traction elements positively in accordance with the direction of rotation of said support to an extent proportional to the angle of said rotational movement.

2. A metal-working machine comprising in combination a pair of carriages adapted to move along mutually perpendicular paths for conveying a thermal implement universally in a plane over a workpiece; a motor rigidly mounted on one of said carriages; a pair of axially aligned oppositely rotatable driving means connected to said motor; a support rotatably mounted relative to said motor; a pair of spaced drive elements carried by said support and in driving engagement with said respective driving means, whereby rotational movement of said support incrementally increases and decreases the rotation of said drive elements in accordance with the direction of rotation of said support to an extent proportional to the angle of said rotational movement; and a traction-propelling device comprising a traction disc driven by said elements and adapted to tractionally engage a plane surface, and means associated with said disc for negativing the effect of the incremental increases and decreases in rotation of the respective drive elements when said support is rotated.

3. A metal-working machine comprising in combination a pair of carriages adapted to move along mutually perpendicular paths for conveying a thermal implement universally in a plane over a workpiece; a motor rigidly mounted on one of said carriages; a pair of axially aligned oppositely rotatable driving means connected to said motor; a support rotatably mounted relative to said motor; a pair of spaced drive elements carried by said support and in driving engagement with said respective driving means, whereby rotational movement of said support incrementally increases and decreases the rotation of said drive elements in accordance with the direction of rotation of said support to an extent proportional to the angle of said rotational movement; and a traction-propelling device comprising a traction disc driven by said elements and adapted to tractionally engage a plane surface, and a differential gear train associated with said disc for negativing the effect of the incremental increases and decreases in rotation of the respective drive elements when said support is rotated.

4. A machine comprising in combination a pair of carriages adapted to be moved along perpendicular paths for conveying an implement universally in a plane over a workpiece; a motor rigidly mounted on one of said carriages; a propelling unit adapted to tractionally engage a pattern for guiding said implement along a predetermined path; transmission mechanism in driven engagement with said motor; and differential means operatively connecting said transmission and said propelling unit, said differential means comprising a pair of mutually telescoped shafts both positively driven by said motor at uniform speed in opposite directions, and spaced driving elements each in driving engagement with one of said shafts, said elements being revolvable about the periphery of said respective positively driven shafts as said unit turns in following said path, thereby to increase and decrease the speed of rotation of said respective elements.

5. A machine comprising in combination a pair of carriages adapted to be moved along perpendicular paths for conveying an implement universally in a plane over a workpiece; a motor rigidly mounted on one of said carriages; a propelling unit adapted to tractionally engage a pattern; a variable speed transmission in driven engagement with said motor; and differential means operatively connecting said transmission and said propelling unit, said differential means comprising a pair of oppositely rotatable mutually telescoped shafts, and spaced driving elements each in driving engagement with one of said shafts, said propelling unit comprising a disc adapted to tractionally engage a plane surface, and including a differential-compensating means associated with said disc for negativing the effect of said differential means.

6. A combined transmission and differential means for a propelling unit comprising means for driving a power shaft at a plurality of speeds; a pair of mutually telescoping drive shafts adapted to be oppositely rotated simultaneously by said power shaft; a pair of spaced traction elements adapted to engage and travel along a templet; and driving means associated with said elements and engaging said drive shafts and being so positioned with respect to said drive shafts that relative axial movement between said elements and said shafts may be effected while maintaining positive drive connections therebetween.

7. A combined transmission and differential means for a propelling unit comprising means for driving a power shaft at a plurality of speeds; a pair of mutually telescoping drive shafts adapted to be oppositely rotated simultaneously by said power shaft; a pair of spaced traction elements adapted to positively engage and travel along a templet; driving means associated with said elements and so positioned with respect to said drive shafts that relative axial movement between the elements and the shafts may be effected while maintaining positive drive connections therebetween; and means for resiliently urging said driving means towards one end of said drive shafts.

8. A shape-cutting machine comprising means for moving a cutting implement over work to be shaped; a motor supported against relative movement with respect to said means; a pair of telescoping shafts in positive driving engagement with said motor; and a rotatable sleeve surrounding said shafts and capable of axial movement relative thereto, said sleeve being adapted to interchangeably support an automatic templet-following device and a hand-guided tracing device in positive driving relation with said shafts.

9. A shape-cutting machine comprising a pair of carriages adapted to be moved along mutually perpendicular paths for transporting a shape cutting implement over work to be shaped; a motor rigidly mounted on one of said carriages against relative movement with respect thereto; variable speed transmission means connected to said motor for rotating a pair of telescoping driven members in opposite directions; a rotatable support and a pair of spaced shafts carried by said support in position to be rotated in opposite directions by said driven members, said support being arranged to interchangeably support an automatic templet-following unit and a hand-guided tracing device.

10. A shape-cutting machine comprising a pair of carriages adapted to be moved along perpendicular paths for transporting a shape-cutting implement over work to be shaped; a motor rigidly mounted on one of said carriages against relative movement with respect thereto; variable speed transmission means connected to said motor for rotating a pair of telescoping driven members in opposite directions; a support, adapted to be turned about the axis of said driven members for supporting a pair of spaced shafts in position to be rotated in opposite directions by said driven members; a unit engageable with said support and having a pair of traction-propelling elements in position to be driven by said shafts; and an interchangeable unit engageable with said support and having a single traction-propelling element in position to be driven by said shafts and incorporating means adapted to compensate for rotational variations of said shafts when said support is turned about the axis of said driven members.

11. A shape-cutting machine comprising in combination, a pair of carriages for moving a cutting implement universally over work to be shaped; a motor mounted against relative movement with respect to one of said carriages; a combined variable speed transmission and differential unit; a pair of oppositely rotatable shafts connected by said unit in positive driving engagement with said motor; a single traction-propelling element driven by said shafts; and means for bodily turning said traction-propelling element independently of both such motor mounting, and said transmission and differential unit.

12. A shape-cutting machine comprising a pair of carriages provided with rollers and arranged for movement along perpendicular sets of tracks, a cutting implement mounted on one of said carriages; traction-propelling means for universally moving said cutting implement in a plane over work to be shaped; and spring-activated means on each carriage adapted to frictionally engage said rollers under predetermined pressure for restricting the machine to movement along a straight line, said spring-activated means being adapted to yield to permit rotation of such frictionally engaged rollers when a predetermined force is applied to said respective carriages.

13. A shape-cutting machine comprising a carriage provided with rollers and movable along a pair of spaced rails; a second carriage provided with rollers and movable along a pair of rails superimposed upon the first carriage and arranged at right angles to the first pair of rails; a cutting implement mounted on said second carriage; traction-propelling means adapted to move said cutting implement universally in a plane over work to be shaped; brake shoes; resilient means adapted to urge said shoes into frictional engagement with the rolling surface of at least one roller of each of said carriages to inhibit the motion of said carriages along their respective rails, thereby to restrict the movement of said cutting implement over said work to straight lines; and manually operable lever means adapted to release said brake shoes from engagement with such rollers, whereby said cutting implement may then be moved universally over said work.

14. A shape-cutting machine comprising a cutting torch adapted to be universally moved in a plane; a hand-guided traction-propelling unit adapted to move said torch in accordance with a predetermined pattern; and pointer means attached to said unit in spaced adjustable relation with respect thereto, said pointer means being adapted to follow the outline of said pattern for locating said unit in predetermined positions laterally with respect to the outline of said pattern to thereby compensate for kerfs of different widths which may be produced in cutting with said torch.

15. A shape-cutting machine comprising a carriage and a cutting torch adapted to be moved universally in a plane over work to be shaped; traction means associated with said carriage including a propelling disc adapted to engage tractionally a plane surface for propelling said carriage and for moving said torch in accordance with a predetermined pattern; kerf-compensation means comprising a pointer secured to said traction means adjacent to said disc and extending substantially perpendicularly toward said surface for location directly above the outline of said pattern, and shifting means for moving said pointer laterally toward and away from said disc to locate said disc in laterally spaced relation to said outline, said kerf-compensation means thereby being adapted to compensate in the size of the finished work for kerfs of different widths which may be produced in cutting with said torch.

16. A shape-cutting machine comprising a pair of carriages adapted to be moved along mutually perpendicular paths, one of said carriages being adapted to support a cutting torch for movement over work to be shaped; a motor rigidly mounted on one of said carriages; oppositely rotatable axially aligned driving means in driving engagement with said motor; rotatable means for supporting hand-guided traction-propelling means, said rotatable means comprising a pair of spaced shafts in driving engagement with said propelling means and said driving means; and means associated with said rotatable means for rotating said torch about its longitudinal axis in accordance with the rotation of said rotatable means and independently of said motor.

17. A shape-cutting machine comprising a pair of carriages adapted to be moved along mutually perpendicular paths, one of said carriages being adapted to support a cutting torch for movement over work to be shaped; a motor rigidly mounted on one of said carriages; oppositely rotatable axially aligned driving means in positive driving engagement with said motor; rotatable means for supporting traction-propelling means, said rotatable means including a pair of laterally spaced shafts connecting said propelling means with said driving means; remote-control means associated with said rotatable means and adapted to control the movement of said traction-propelling means; and means associated with said remote-control means for rotating said torch about its longitudinal axis in accordance with the rotation of said rotatable means and independently of said motor.

18. A shape-cutting machine comprising a pair of carriages adapted to be moved along mutually perpendicular paths; a cutting torch associated with one of said carriages; a motor rigidly mounted on one of said carriages; oppositely rotatable axially aligned driving means in driving engagement with said motor; a rotatable traction-propelling device adapted to move said torch universally over work to be cut, said device comprising a pair of spaced shafts in driving engagement with said driving means, and means for interchangeably supporting templet-following and hand-guided-tracing means for connection with said shafts; steering means associated with said traction-propelling device adapted to control the movement of said hand-guided-tracing means; and a torch support including means for rotating said torch about its longitudinal axis when said traction-propelling device is rotated about its longitudinal axis, and in accordance with the degree of rotation of said device, as either of said templet-following or hand-guided-tracing means follows a curved templet or a curved path.

19. A shape-cutting machine comprising a lower carriage adapted to be moved along a pair of rails; an upper carriage adapted to be moved along a pair of rails mounted on said lower carriage at right angles to the lower-carriage rails; a plurality of pairs of upper and lower rollers mounted on said upper carriage at points spaced longitudinally thereof and adapted to engage the upper and lower surfaces respectively, of the rails of said upper carriage; and connecting means mounting one pair of said lower rollers to said upper carriage for self-adjusting movement of said connecting means relative to said upper carriage and independently of the remaining pairs of said rollers for insuring constant engagement of such mounted pair of lower rollers with the under surface of the rails of said upper carriage.

20. A shape-cutting machine as claimed in claim 19 in which said connecting means comprises a self-adjustable pivoted mounting for said pair of lower rollers.

21. A shape-cutting machine comprising an upper and lower carriage adapted to be moved along mutually perpendicular paths; a cutting torch mounted at one end of said upper carriage; a traction-propelling device associated with said upper carriage and located near the other end thereof; and dual control means associated with each end of said upper carriage, whereby the complete operation of said machine may be effected from the torch end as well as from the traction end of said machine, said dual control means including means at spaced points along said upper carriage for starting, stopping, or reversing the operation of a motor connected to said traction-propelling device; and means at spaced points along said upper carriage for controlling the flow of oxygen and acetylene to said cutting torch.

22. A shape-cutting machine comprising a pair of carriages adapted to be moved along mutually perpendicular paths; a traction-propelling device associated with said carriages and comprising a pair of oppositely rotatable shafts; a variable speed transmission including a planetary gear train; a simultaneously operable brake and clutch means cooperable with said train for changing the speed of said transmission; and differential means connecting said traction-propelling device and said variable speed transmission, so constructed and arranged that bodily turning of said device effects differential rotation of said pair of oppositely rotatable shafts.

23. A traction-propelling unit for use with a machine adapted to be moved universally over work, comprising in combination, a pair of laterally spaced parallel shafts having means adapted to frictionally engage a raised templet; a motor; oppositely rotatable means positively driven by said motor for driving both of said shafts positively in opposite directions; and means for supporting said shafts relative to said driving means so that during bodily turning of said shafts with said supporting means as a unit relatively to said driving means as when following a curved templet, said shafts cooperate with said oppositely rotatable means to positively decrease and positively increase the rates of rotation of the respective shafts depending upon the direction and speed at which said shafts are turned as a unit.

24. A traction-propelling unit as claimed in claim 23, in which said driving means comprises axially aligned oppositely rotatable means positioned at the axis of said supporting means at equal distances from and in driving engagement with said laterally spaced shafts.

25. A traction-propelling unit as claimed in claim 23 in which said oppositely rotatable driving means includes a pair of pinions located axially with respect to said supporting means and in driving engagement with pinions on the respective laterally spaced shafts.

SAMUEL R. OLDHAM.